United States Patent [19]

Hedenberg

[11] 3,930,436

[45] Jan. 6, 1976

[54] SERVO DEVICE PARTICULARLY FOR STEERING GEARS

[75] Inventor: Gunnar Hedenberg, Trollhattan, Sweden

[73] Assignee: Volvo Flygmotor Aktiebolag, Trollhatton, Sweden

[22] Filed: Dec. 5, 1973

[21] Appl. No.: 422,113

[52] U.S. Cl. ............... 91/49; 91/51; 91/216 A; 91/376 R
[51] Int. Cl.² ............... F01B 15/02; F15B 9/10
[58] Field of Search ............... 91/51, 49, 216 A

[56] References Cited
UNITED STATES PATENTS

| | | | |
|---|---|---|---|
| 2,317,383 | 4/1943 | Hull | 91/51 |
| 2,432,502 | 12/1947 | Bentley et al. | 91/51 |
| 2,867,233 | 1/1959 | Adelson | 91/51 |
| 2,977,985 | 4/1961 | Ericson et al. | 91/51 |
| 3,045,651 | 7/1962 | Ljunggren | 91/51 |
| 3,113,590 | 12/1963 | Olson | 91/51 |
| 3,799,202 | 3/1974 | McAvby | 91/51 |

*Primary Examiner*—Paul E. Maslousky
*Attorney, Agent, or Firm*—Pollock, Philpitt & Vande Sande

[57] ABSTRACT

A servo device for steering gears for vehicles and ships is adapted to be coupled in a mechanical connection between said gear or the like and the steering rod or the like operated thereby. The device comprises a pair of opposed cylinder-and-piston units each having a working chamber, defined by the respective piston and adapted to be supplied pressurized fluid from a suitable source during control by valve means responsive to a movement of the output member of said gear and the resistance thereagainst of the steering rod operated thereby so as to amplify the power for overcoming said resistance by means of the pressure fluid in one of said pair of working chambers. The two pistons in the units are rigidly secured to each other and provided with an inlet passage for the pressure fluid to the working chambers and wherein the valve device of each of the units comprises a valve member, adapted normally to close a corresponding pressure fluid outlet from the working chamber to a return conduit to the pressure fluid source but to be actuated by movements of the output member of the gear under the intermediation of a transfer means for actuating in its turn a dampening element with a restricted fluid passage.

7 Claims, 4 Drawing Figures

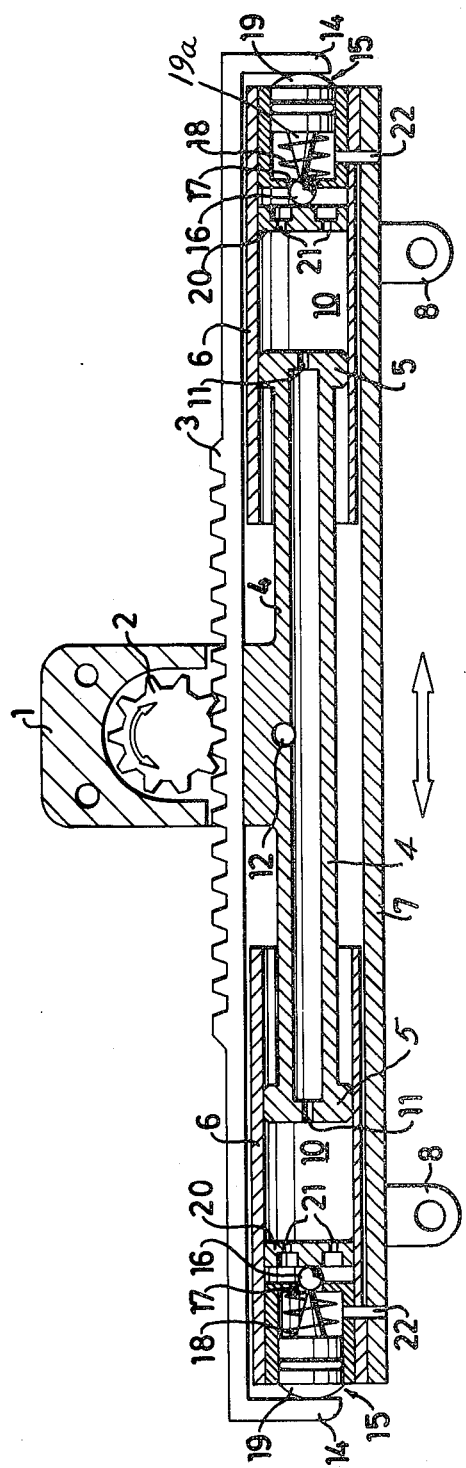

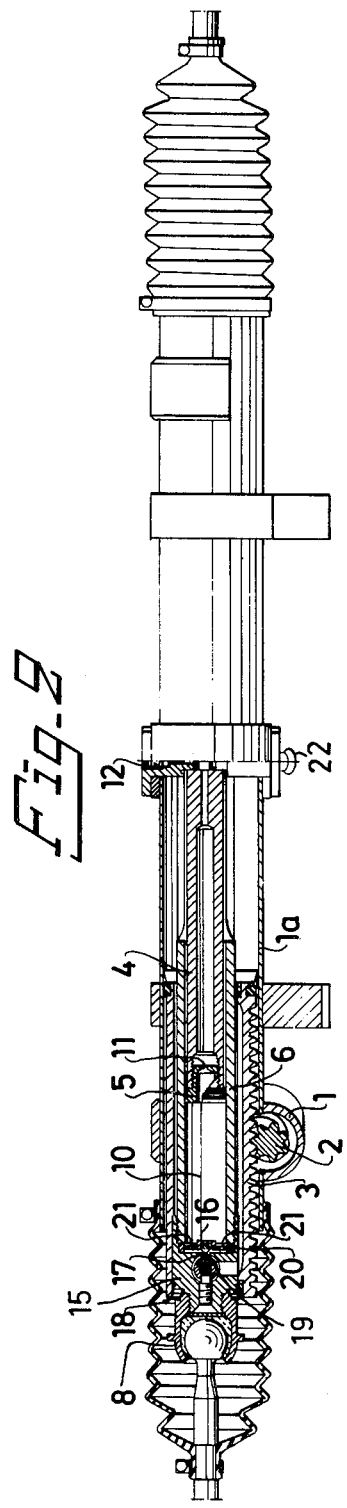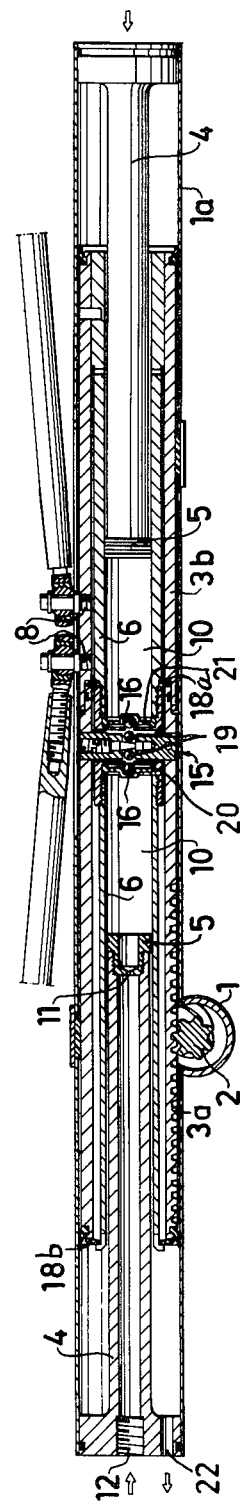

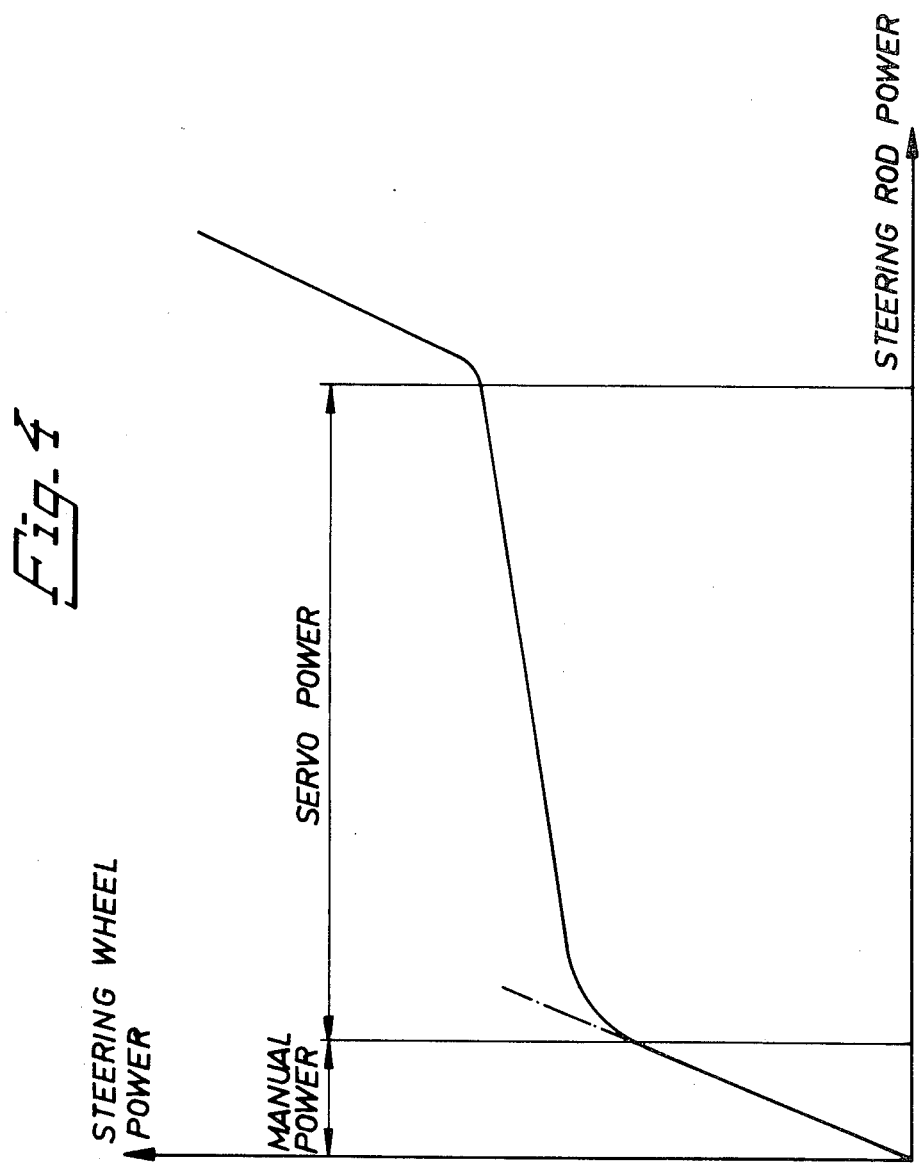

SERVO DEVICE PARTICULARLY FOR STEERING GEARS

The present invention refers to a servo device particularly for steering gears for vehicles and ships and adapted to be coupled in a mechanical connection between said gear or the like and the steering rod or the like operated thereby, said device comprising a pair of opposed cylinder-and-piston units preferably mutually aligned and each having a working chamber, defined by the respective piston and adapted to be supplied pressurized fluid from a suitable source during control by valve means responsive to a movement of the output member of said gear and the resistance thereagainst of the steering rod or the like operated thereby so as to amplify the power for overcoming said resistance by means of the pressure fluid in one of said pair of working chambers.

Generally servo devices are known for a number of purposes and particularly for facilitating various operations when making manoeuvres with vehicles. Servo devices of the kind stated for facilitating the steering of vehicles constitute one example of such devices and have in the last years been increasingly adopted in practice.

In connection therewith, the drawbacks of the known steering servo devices hitherto known have been found more and more troublesome. The kind of such steering servo devices which in practice most often has been applied has utilized slide valves and operated with a hydraulic oil pressure of about 70 bar or less. Slide valves cannot, however, without great economic sacrifice and/or while accepting reduced service life, be brought to close completely at such pressures. Therefore leakage has been accepted and the oil has been continuously pumped in a circuit from the center of the valve and through the valve chambers to a return conduit, a so-called open center principle. The slide valves utilized therefore have had a controlling but not at all a closing function and the pumping circulation of oil implies a continuous, non-utilized oil flow as well as heat losses.

There have not either been any advantages of increasing the operating pressure in the known servo devices with slide valves, particularly dependent on the fact that the required pump will be very big and power consuming and that in the existent geometrical solutions high pressure shaft seals must be let to seal against non-drained spaces for reasons of cost. When increasing the pressure, the friction also increases and should a pressure drop occur said high friction must be manually overcome. Thus the known technique have a plurality of drawbacks, such as great oil consumption, high self-friction and great costs as well as a narrow pressure range.

As examples of such previously known servo devices, particularly for vehicle steering gears but thus having several drawbacks, can be mentioned the German Pat. No. 883,710 and the German Auslegeschrifts Nos. 1,050,671 and 1,195,182. Recently some designs have been suggested, in which higher hydraulic oil pressures are adapted to be utilized and in which thus "closed" slide valves (closed center) are to be utilized. The French Pat. Nos. 1,108,056 and 1,364,591 constitute examples of this. Certainly, the high pressure provides the possibility of reducing the size of the pump, the oil sump and the conduits and as a consequence reduces the over all dimensions of the device, but the drawback achieved is that the structure will be very complicated and extremely expensive. Thus, said suggested structures for higher pressures do not constitute any practically advantageous solution; but there is a great demand for an improved construction which can be made simple and inexpensive in spite of the fact that it operates with high pressures.

The main object of the present invention thus is to suggest such an improved construction of a servo device of the kind stated above. Said object is achieved substantially in that the two pistons in the units are rigidly secured to each other and provided with an inlet passage for the pressure fluid, preferably hydraulic fluid, to the working chambers and wherein the valve device of each of the units comprises a valve member, adapted normally to close a corresponding pressure fluid outlet from the working chamber to a return conduit to the pressure fluid source but to be actuated by movements of the output member of the gear under the intermediation of a transfer means for actuating in its turn a dampening element with a restricted pressure fluid passage.

Owing to the invention, it is now possible to obtain a servo steering device which fills the modern requirements for driving characteristics of vehicles, primarily passenger cars and trucks and which in spite of low costs and simple construction will give a more direct steering with a convenient but sufficient steering resistance and sufficient steering assistance in heavy road conditions, parking manoeuvres and emergency situations following tire explosions etc. A very essential advantage of the invention is that it can provide a momentary servo assistance when the steering resistance in the steering wheel has reached a predetermined threshold value and it then can be provided that the steering wheel force either is maintained substantially constant or made to increase with the steering force demand along an arbitrary curve.

By way of examples, the invention will be further described below with reference to the accompanying drawings, in which:

FIG. 1 is a longitudinal section through a principle embodiment of the device according to the invention;

FIG. 2 is a side elevational view, partially in longitudinal section of another embodiment of the device particularly advantageous for practical applications;

FIG. 3 illustrates a further embodiment for practical applications and constituting a technical inversion of the device according to FIG. 2; and FIG. 4 finally is a schematic diagram illustrating the function of the device.

As already mentioned, FIG. 1 is a principle embodiment of the device according to the invention. Although the device also can be applied to a steering gear of worm-and-screw-type, it has been illustrated in FIG. 1 as applied to a steering gear of the rack type. Said gear has a stationary housing 1 with a pinion 2 journalled therein, said pinion being actuated by the steering wheel (not illustrated) of a vehicle and in its turn adapted to actuate a steering rack 3. Two mutually opposite piston rods and pistons 4 and 5 respectively, preferably located on the same axis are stationary mounted adjacent the rack, preferably in connection with the steering gear housing 1. A cylinder 6 is adapted to slide on each of said pistons 5, and the two cylinders are mutually connected by means of a support body 7. On said support body 7 are mounted one or more connection means 8 for connecting the support body with the steering rod or rods in the steering mechanism of the vehicle, which are to be actuated by the steering gear.

The pistons 5 define in the cylinders 6 a working chamber 10. Furthermore the pistons 5 are provided with an inlet passage 11 for letting in a pressure fluid, preferably hydraulic oil, from a suitable source (not illustrated) through an inlet conduit 12 to the respective working chambers 10.

As illustrated in FIG. 1 in the drawings, the rack 3 in the now described embodiment of the invention is suitably located parallel to the cylinders 6 carried by the support body 7 and closely adjacent said cylinders. At its ends the rack 3 has angular levers 14 which embrace the remote outer ends of the cylinders 6. At said ends the cylinders have valve devices generally designated 15. More particularly said valve devices, which are mutually similar, include a valve body 16 adapted normally to close a pressure fluid outlet 17 from the working chamber 10. Between the respective rack arm 14 and valve body 16 is arranged a transmission or piston means 19, biased by a spring 18, for actuation of the valve body 16 and opening of the pressure fluid outlet 17. An extension 19a from piston 19 is attached to valve body 16 to open the valve upon movement of piston 19. Adjacent the valve body 16 is furthermore movably mounted in the working chamber 10 a dampening means 20 with a restricted pressure fluid passages 21. Pressure fluid let out through the outlet 17 is adapted to be returned to the pressure source (not illustrated) through a non-pressurized return conduit 22.

The distance between the rack levers 14 is chosen slightly greater than the distance between the remote outer ends of the cylinders 6 with the valve devices 15 located therein. The spring-biased transmission means 19 are kept pressed against the levers 14 and do not act on the valve body 15 while in position of rest, and therefore the pressure fluid outlet 17 is closed. Through the inlet conduit 12 and the pressure fluid passage 11 in the pistons 5 the working chambers 10 of the cylinders are maintained filled with pressure fluid, suitably with high pressure, preferably hydraulic oil with a pressure of about 150 bar. FIG. 1 illustrates the principle embodiment of the device in such a position of rest of both the valve devices 15.

As soon as the pinion 2 of the steering gear is rotated in either direction, say clockwise in FIG. 1, the rack is moved, in this case to the left. As long as the resistance against this steering movement from the steerable wheels through the steering rods and steering rod connection means 8 does not exceed the fluid pressure on the valve body 16 plus the biasing force of the spring 18 in the valve device 15 in question, thus the right one in the drawings, the servo device stays in rest and the steering occurs directly without servo assistance.

When the resistance against the steering movement through the connection means 8 raises to a value exceeding the fluid pressure on the valve body 16 plus the biasing force of the spring 18, the transmission member 19 will however be urged into the cylinder against the action of the spring 18 and the valve body load and thus actuate the valve body 16 so as to open the pressure fluid outlet 17 in the right valve device 15. The left valve device 15 remains closed. When moving the valve body 16 by means of the transmission means 19 in the right valve device 15 however, the dampening means 20 in this working chamber is actuated, which dampening means in this case has been illustrated as a piston member 20, freely slidable in this working chamber and having a restricted pressure fluid passages 21. For obtaining the intended servo function, said pressure fluid passage 21 must be calibrated in their dimensions in relation to the inlet passage 11 in the respective piston 5. In a practical embodiment, the inlet passage 11 in the piston 5 thus has been made as a bore having a diameter of 0,75 millimeters, while the pressure fluid passage 21 in the dampening means has been made as two penetrating bores having a diameter of 1,2 millimeters.

The opening of the pressure fluid outlet 17 at the right valve device 15 therefore implies that the right cylinder working chamber 10 is drained of pressure fluid, while the left cylinder working chamber 10 instead is filled by high pressure fluid and develops a force assisting the steering movement in the desired direction as a result of the movement of the interconnected pistons to the left which then moves the support body to the left as well. As soon as the resistance against the steering movement from the steering rods or the steering movement per se ceases, the transmission means returns to its position of rest and the outlet 17 is closed by the valve body 16, the servo function ceasing.

From the above-described principle embodiment of the invention, it is clearly evident the great possiblities which, exist for obtaining a servo operation, which on the one hand, does not until after overcoming an initial resistance of the steering, and which creates a comfortable sense to the driver of having good control over the steering, and which, when being put into action, can be calibrated to a smooth and pleasant course, which also is understood as advantageous by the car driver.

In FIG. 4 is illustrated a schematic diagram of the steering wheel force in relation to the steering rod force and how manual force and servo force can be adopted to each other by suitable adaptation of the spring bias and pressure fluid passage sizes in the device.

A further advantage of the device is that it provides complete steering safety under all conditions, even in a servo action loss by some possible malfunction of the pressure fluid system or the like. In a servo action loss furthermore the self-friction, which is to be overcome in the servo device in direct, completely manual steering, is extremely low due to the few seals which are present in the device.

From the description above of the principle embodiment of the device, it is also clearly evident the many advantages thereof. Thus, the device according to the invention provides a low total oil consumption due to momentary valve operation and all internal high-pressure liquid goes to drained spaces. The internal friction is low and the manufacturing costs also are low due to the low number of parts, which preferably can be made as rotational-symmetric parts suitable for mass production. Finally, it is possible to let the steering be completely manual for low steering resistance up to a predetermined desired value, so that only after exceeding said value does the servo action occur.

Another very essential advantage of the device according to the invention is the fact that it can be realized in a plurality of different ways in very compact designs, which are extremely advantageous for their practical application. One example of this is illustrated in FIG. 2. In FIG. 2 the parts corresponding to FIG. 1 have been provided with the same reference numerals and by this the principle similarity with the embodiment according to FIG. 1 can clearly be seen. For practical reasons, however, some detail alterations have been made and thus the cylinders 6 are made of a common tubular blank, which in its intermediary portion has been slotted to a suitable extent, and therefore the support body has been omitted. The steering rack 3 is formed on a member, which also is tubular and slightly slidably surrounds at least the end of each cylinder 6 carrying the valve device 15. The levers of the rack element are formed by a pin 14 rigidly secured in the rack tube 3 and extending with required play through a corresponding aperture in the housing of the valve device 15 so as to engage the transmission means 19, which also has the form of a ball. The relative sliding movement between the rack tube 3 and the housing of the valve device 15 located therein, with which device the connection means 8 is rigidly connected and which in its turn is rigidly secured to the end of the associated cylinder 6, occurs as previously against the action of a biasing spring 18. Furthermore, the dampening means is changed from a freely movable piston in the working chamber 10 of the cylinders 6 to a diaphragm 20 clamped between the housing of the valve device 15 and the end of the cylinder 6, said diaphragm being axially resilient when acting upon the valve body 15 by means of the ball-shaped transmission means 19. Furthermore, the whole assembly is kept in a capping tube 1a connected with the steering gear housing 1. As is seen therefrom, the servo device according to the invention can be given a very compact, and in all respects an advantageous form in its practical application.

In FIG. 3 is illustrated a technical inversion of the embodiment according to FIG. 2. In this last-mentioned embodiment, the pistons 5 thus have been turned towards each other with the piston rods 4 extending from each other and at their outer ends connected with a common capping tube 1a, connected with the steering gear housing 1. With this design, the two cylinders 6 can be connected to a common twin-valve device 15 at their adjacent inner ends. In said embodiment, the same design of the dampening means 20 has been chosen as in the embodiment according to FIG. 2, but to obtain the required actuation of the valve device 15, the steering rack tube enclosing the cylinders has been divided in two portions 3a and 3b. One of these portions 3a, by means of a first biasing spring 18a, is made as a washer spring and is connected with one of the cylinders 6 to allow a small axial relative movement between them for actuation of the valve body 16 associated with the pressure fluid outlet of said cylinder, while the other steering rack tube portion 3b is slidably guided on the first-mentioned portion 3a and rigidly secured to the other cylinder 6. Between the last-mentioned and the adjacent end of the first steering rack tube portion 3a there is arranged a second biasing spring 18b also in the form of a washer spring. The connection means 8 for connection with the respective steering rods are connected with the second steering rod portion 3b, as is evident from the drawings. Also with this inversed technical solution, a design is obtained, which is very compact and furthermore that the number of parts in the device can be further slightly reduced relative the embodiment according to FIG. 2.

Although the invention has been described above as applied to steering gears in vehicles it is also obvious that the same can be used in other apparatus and mechanisms in which a force transmission between two means is to be amplified in some way or other. Furthermore, the device according to the invention can be modified and varied by artisans for adaptation to occuring demands in a number of different ways within the scope of invention such as defined in the accompanying claims.

What I claim is:

1. A servo device, comprising:
   first and second cylinders connected for movement in essentially fixed relation to each other by a support body;
   first and second pistons connected to each other and located within said cylinders, said pistons and cylinders defining first and second working chambers;
   first means for pressurizing said working chambers with high pressure fluid;
   second and third means respectively connected to each working chamber and normally closed for preventing flow of said high pressure fluid from each said working chamber;
   fourth means for transmitting force to said support body to translate said cylinders relative to said pistons;
   fifth means connected to said second and third means, for selectively opening said second or said third means to permit said high pressure fluid to exhaust from one of said first or said second working chambers when the force transmitted by said fourth means exceeds a predetermined value to produce pressure differential between said two cylinders which adds to the force transmitted by said fourth means to said support body; and
   first and second damping members mounted respectively for axial movement in each of said hydraulic cylinders, each of said damping members having a restricted venting port therethrough for controlling depressurization of its respective working chamber.

2. The servo device of claim 1 wherein said damping members each comprise a freely slidable piston in each said working chamber, said slidable piston having a through bore which forms said restricted venting port.

3. The servo device of claim 1 wherein said damping members each comprise an axially resilient diaphragm secured to an end wall of said cylinder and having an axial bore therein which forms said restricted venting port.

4. The servo device of claim 1, wherein said pistons are fixed.

5. The servo device of claim 1, wherein said fourth means comprises first and second spring-biased pistons mounted for movement relative to said support body;
   a first member movable in response to said force, said first member having at least one lever element located to contact at least one of said spring-biased pistons upon movement of said first member, whereby force is transmitted from said first member, via said at least one spring-biased piston, to said support body.

6. The servo device of claim 5, wherein said fifth means comprises second and third members extending respectively from each of said spring-biased pistons for forcing said second and third means open in response to movement of said spring-biased pistons.

7. The servo device of claim 1, wherein said pressurizing means comprises a passage into said working chambers through each of said pistons.

* * * * *

UNITED STATES PATENT AND TRADEMARK OFFICE
CERTIFICATE OF CORRECTION

PATENT NO. : 3,930,436
DATED : January 6, 1976
INVENTOR(S) : Gunnar Hedenberg

It is certified that error appears in the above—identified patent and that said Letters Patent are hereby corrected as shown below:

Foreign Application Priority Data

December 8, 1972   Sweden. . . . . . . . . 16045/72

Signed and Sealed this sixteenth Day of March 1976

[SEAL]

Attest:

RUTH C. MASON
*Attesting Officer*

C. MARSHALL DANN
*Commissioner of Patents and Trademarks*